(12) United States Patent
Sjodin et al.

(10) Patent No.: US 9,557,973 B2
(45) Date of Patent: Jan. 31, 2017

(54) AUTOMATIC GENERATION OF API CLASSES

(71) Applicant: KING.COM LIMITED, St. Julians (MT)

(72) Inventors: Lars Sjodin, Stockholm (SE); Patrik Stymne, Stockholm (SE)

(73) Assignee: KING.COM LTD., St. Julians (MT)

( * ) Notice: Subject to any disclaimer, the term of this patent is extended or adjusted under 35 U.S.C. 154(b) by 75 days.

(21) Appl. No.: 14/244,328

(22) Filed: Apr. 3, 2014

(65) Prior Publication Data

US 2014/0337823 A1 Nov. 13, 2014

(30) Foreign Application Priority Data

Apr. 3, 2013 (GB) .................................. 1306036.3

(51) Int. Cl.
*G06F 9/45* (2006.01)

(52) U.S. Cl.
CPC . *G06F 8/41* (2013.01); *G06F 8/42* (2013.01); *G06F 8/43* (2013.01); *G06F 8/436* (2013.01)

(58) Field of Classification Search
CPC ................ G06F 8/44; G06F 8/42; G06F 8/43; G06F 8/436
USPC .................................................. 717/140, 141
See application file for complete search history.

(56) References Cited

U.S. PATENT DOCUMENTS

| | | | | | |
|---|---|---|---|---|---|
| 5,675,805 | A * | 10/1997 | Boldo | ........................ | G06F 8/30 717/114 |
| 5,926,636 | A * | 7/1999 | Lam | ........................ | G06F 9/547 709/232 |
| 6,986,124 | B1 * | 1/2006 | Field | ........................ | G06F 8/30 709/230 |
| 8,615,750 | B1 * | 12/2013 | Narayana Iyer | ........ | G06F 8/456 709/203 |
| 8,843,909 | B2 * | 9/2014 | Tondreau, Jr. | ........... | G06F 8/45 717/103 |
| 2008/0178149 | A1 * | 7/2008 | Peterson | ................. | G06F 8/443 717/110 |
| 2009/0122062 | A1 * | 5/2009 | Kilpatrick | ............... | G06T 15/80 345/426 |
| 2012/0079463 | A1 * | 3/2012 | Freeman | ................... | G06F 8/70 717/137 |
| 2014/0282444 | A1 * | 9/2014 | Araya | ....................... | G06F 8/42 717/143 |
| 2014/0337823 | A1 * | 11/2014 | Sjodin | ....................... | G06F 8/42 717/144 |

OTHER PUBLICATIONS

Legato-Interface Definition Languauge-2015, Located at http://www.legato.io/legato-docs/15__10/interface_def_lang.html 2015.*
c2com-Abstract Syntax Tree-2012, located at http://c2.com/cgi/wiki?AbstractSyntaxTree, 2912.*

(Continued)

*Primary Examiner* — Wei Zhen
*Assistant Examiner* — Hossain Morshed
(74) *Attorney, Agent, or Firm* — Saul Ewing LLP

(57) ABSTRACT

A compiler for compiling a server application is disclosed wherein the server is configured to automatically generate an API (Application Programming Interface) for use is a client device. The API allows communication between the client device and the compiled server application.

18 Claims, 7 Drawing Sheets

(56) References Cited

OTHER PUBLICATIONS c2Com-Abstract Syntax Tree-2012, located at http://c2.com/cgi/wiki?AbstractSyntaxTree Captured in 2012.*
Cohen et al., Transactions on Aspect-Oriented Software Development II Lecture Notes in Computer Science; LNCS, pp. 101-146 (Jan. 1, 2006) XP019050991.
Albanese et al., Software Maintenance and Reengineering, 2002. Proceedings. Sixth European Conference on Budapest, Hungary, pp. 154-163 (Mar. 11, 2002) XP010588750.
International Search Report, dated Jun. 12, 2014, and Written Opinion issued in corresponding International Application No. PCT/EP2014/056751.

* cited by examiner

AUTOMATIC GENERATION OF API CLASSES

CROSS-REFERENCE TO RELATED APPLICATIONS

This application is based on, and claims priority to, Great Britain Application No. GB 1306036.3, filed Apr. 3, 2013, the entire contents of which is fully incorporated herein by reference.

FIELD OF THE INVENTION

Some embodiments relate to a method and system for data cache handling in a server. The server may be used to handle data requests for the purposes of providing information to computer gaming software running on a client device.

BACKGROUND OF THE INVENTION

In computer gaming, it is commonplace to communicate over a network to provide additional functionality. This communication is often performed between a server and a client device. In order to assist in communication between a client device and a server, an Application Programming Interface (API) is often used to provide an interface layer at the client.

SUMMARY OF THE INVENTION

According to a first embodiment there is provided a method comprising: receiving programming code for a server application; determining at least one programming code for a corresponding client interface dependent on at least one rule; and compiling the received programming code into an executable server application.

The client interface may be an API (Application Programming Interface).

The method may comprise constructing an abstract syntax tree from said received programming code.

The method may comprise determining from said abstract syntax tree if said received programming code comprises at least one unsupported variable type.

The method may comprise displaying an indication that said received programming contains an unsupported programming code dependent on said determining.

Said determining at least one programming code may be dependent on the contents of said abstract syntax tree.

The at least one rule may be dependent on a target programming language.

The at least one rule may be dependent on a target operating system.

The method may comprise determining a plurality of programming codes for different corresponding client interfaces dependent on at least one rule.

The at least one programming code may be automatically updated when the programming code for the server application is compiled.

According to a second aspect there is provided a compiler configured to receive programming code for a server application; determine at least one programming code for a corresponding client interface dependent on at least one rule; and compile the received programming code into an executable server application.

The client interface may be an API (Application Programming Interface).

The compiler may be configured to construct an abstract syntax tree from said received programming code.

The compiler may be configured to determine from said abstract syntax tree if said received programming code comprises at least one unsupported variable type.

The compiler may be configured to display an indication that said received programming contains an unsupported programming code dependent on said determining.

Said determining at least one programming code may be dependent on the contents of said abstract syntax tree.

The at least one rule may be dependent on a target programming language.

The at least one rule may be dependent on a target operating system.

The compiler may be configured to determine a plurality of programming codes for different corresponding client interfaces dependent on at least one rule.

The compiler may be configured to automatically update the at least one programming code when the programming code for the server application is compiled.

BRIEF DESCRIPTION OF DRAWINGS

To understand some embodiments, reference will now be made by way of example to the accompanying drawings, in which.

DETAILED DESCRIPTION OF THE INVENTION

Figure 1:
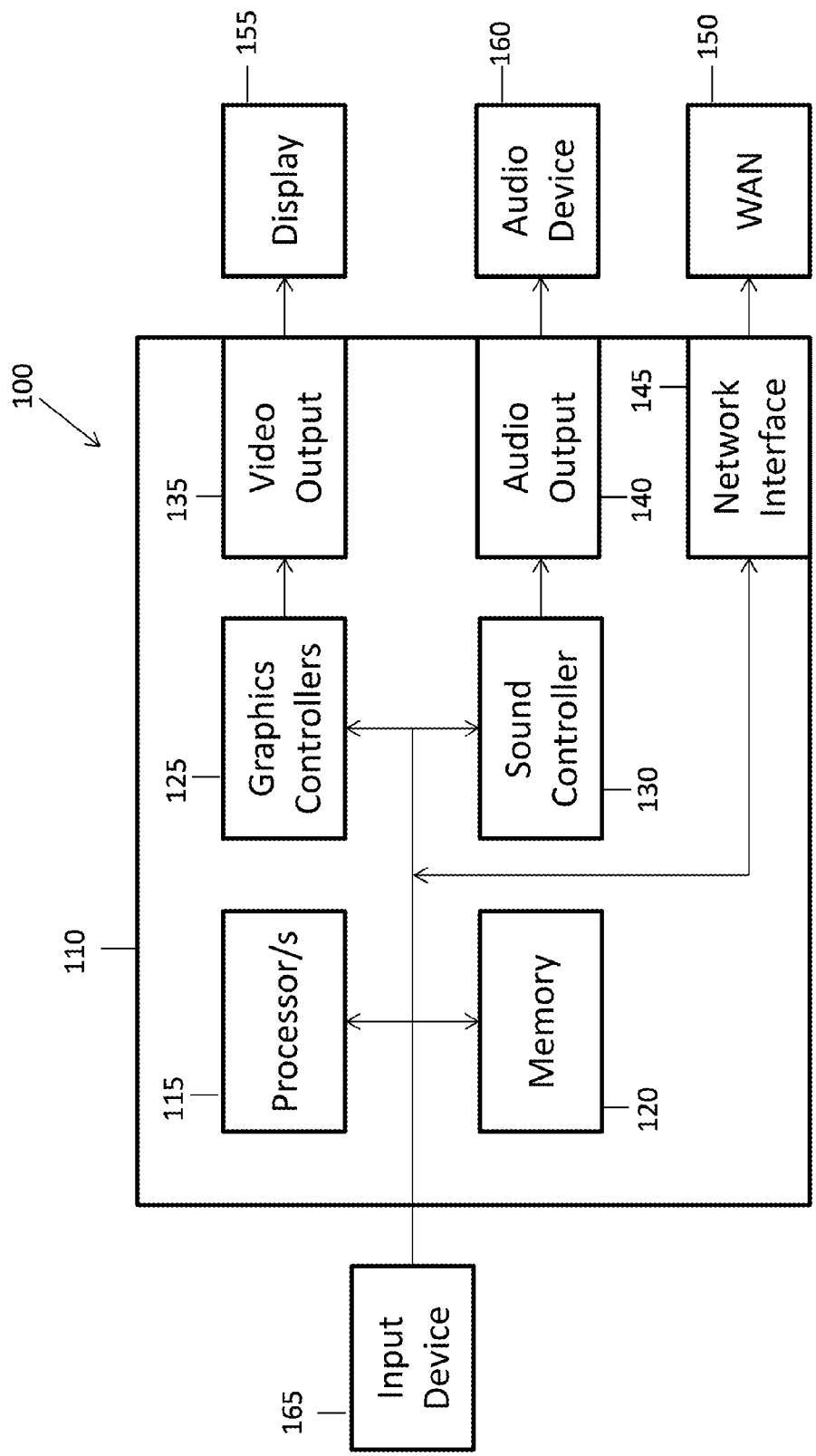
FIG. 1 shows an example computing device of an embodiment.

A schematic view of a user device 100 according to an embodiment is shown in FIG. 1. All of the blocks shown are implemented by suitable circuitry. The blocks may be implemented in hardware and/or software. The user device may have a control part 110. The control part 110 has one or more processors 115 and one or more memories 120. The control part 110 is also shown as having a graphics controller 125 and a sound controller 130. It should be appreciated that one or other or both of the graphics controller 125 and sound controller 130 may be provided by the one or more processors 115.

The graphics controller 125 is configured to provide a video output 135. The sound controller 130 is configured to provide an audio output 140. The controller 110 has an interface 145 allowing the device to be able to communicate with a network 150 such as the Internet or other communication infrastructure.

The video output 135 is provided to a display 155. The audio output 140 is provided to an audio device 160 such as a speaker and/or earphone(s).

The device 100 has an input device 165. The input device 165 can take any suitable format and can be one or more of a keyboard, mouse, touch screen, joystick or game controller. It should be appreciated that the display 155 may in some embodiments also provide the input device 165 by way of an integrated touch screen for example.

The blocks of the controller 110 are configured to communicate with each other by an interconnect such as a bus or any other suitable interconnect and/or by point to point communication.

It should be appreciated that in some embodiments, the controller 110 may be implemented by one or more integrated circuits, at least in part.

The user device 100 is shown by way of example only. In alternative embodiments, one or more of the parts may be omitted. Alternatively or additionally, some embodiments may comprise one or more other parts. Alternatively or additionally, one or more parts may be combined.

Figure 2:
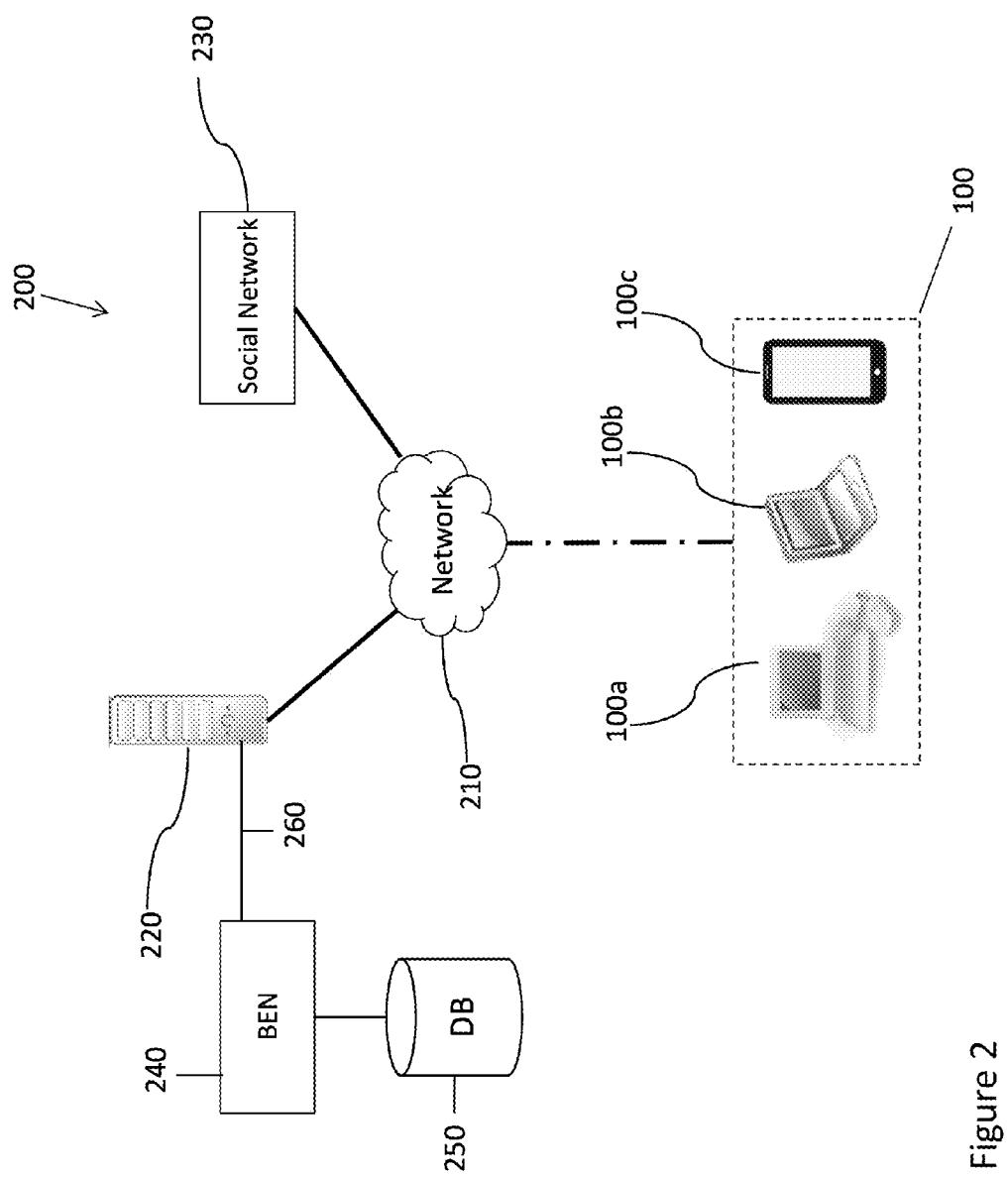
FIG. 2 illustrates an example system in which some embodiments may be provided.

FIG. 2 schematically shows a system 200 in some embodiments. The system 200 comprises a server 220 which may store or be in communication with databases 250 which may be, in some embodiments, connected to a back end infrastructure 240 "BEN") of game player's details, profiles, statistics, etc. In practice, one or more databases 250 may be provided. Where more than one server 220 is provided, the database(s) 250 may be provided in one database 250 or across two or more servers 220, 310. The server 220 may also have a games data function. This may comprise one or more units of memory to store the computer game program and user behaviour data, and a processor to run the games program and process the user behaviour data.

The server 220 may communicate via for instance the internet 210 to one or more user devices 100, shown in the figure by way of example as user devices 100a, 100b and 100c, and may further provide connections to a social network 230.

Figure 3:
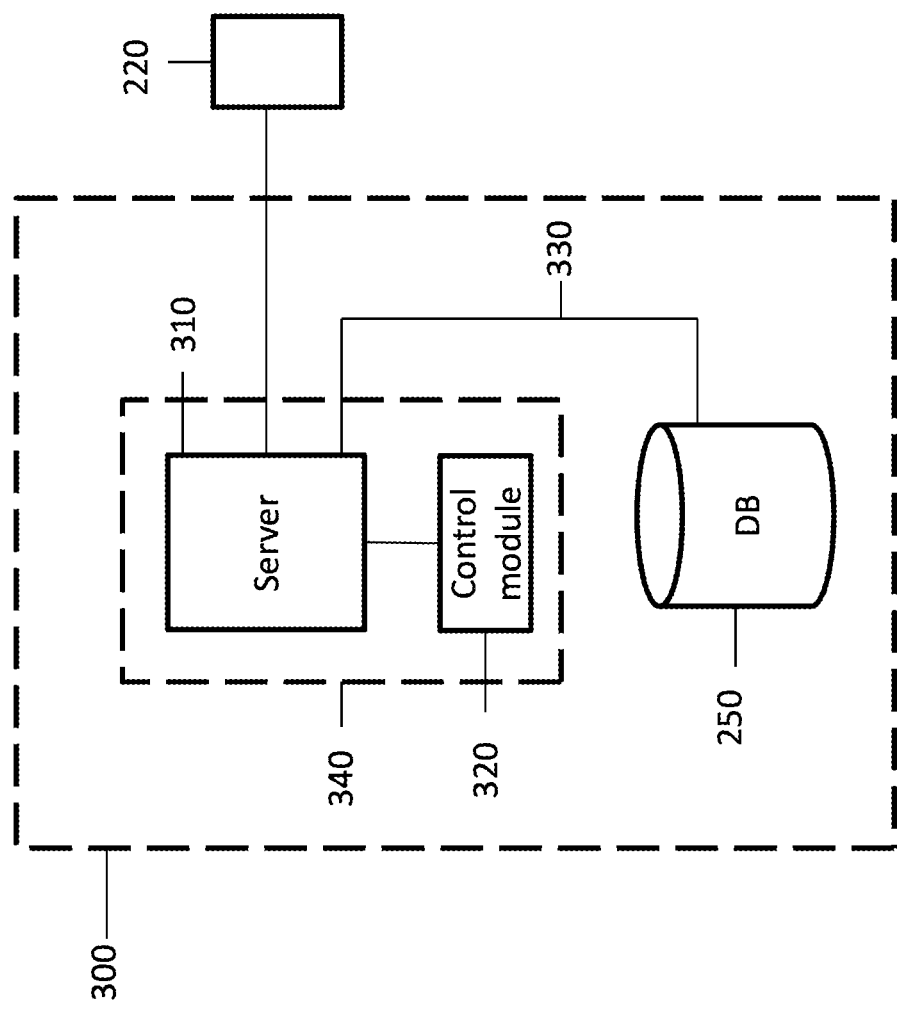
FIG. 3 shows a back-end system according to some embodiments.

FIG. 3 illustrates a back end infrastructure 300 according to an embodiment, comprising a server 310 in communication with or connected to a control module 320. The control module 320 may be implemented 340 as part of server 310, or may be a separate module 320 external to and connected with the server 310. The server 310 may be one of many servers, such as those known to the person skilled in the art as a server farm 340, or rack.

The server 310 or farm 340 may be connected as shown to server 220, and to database 250 via link 330. Link 330 may be wired, wireless and/or provided via or through networks such as the internet, as known to those persons skilled in the art. The control module 320 provides control and update of data in the database(s) 250.

Figure 4:
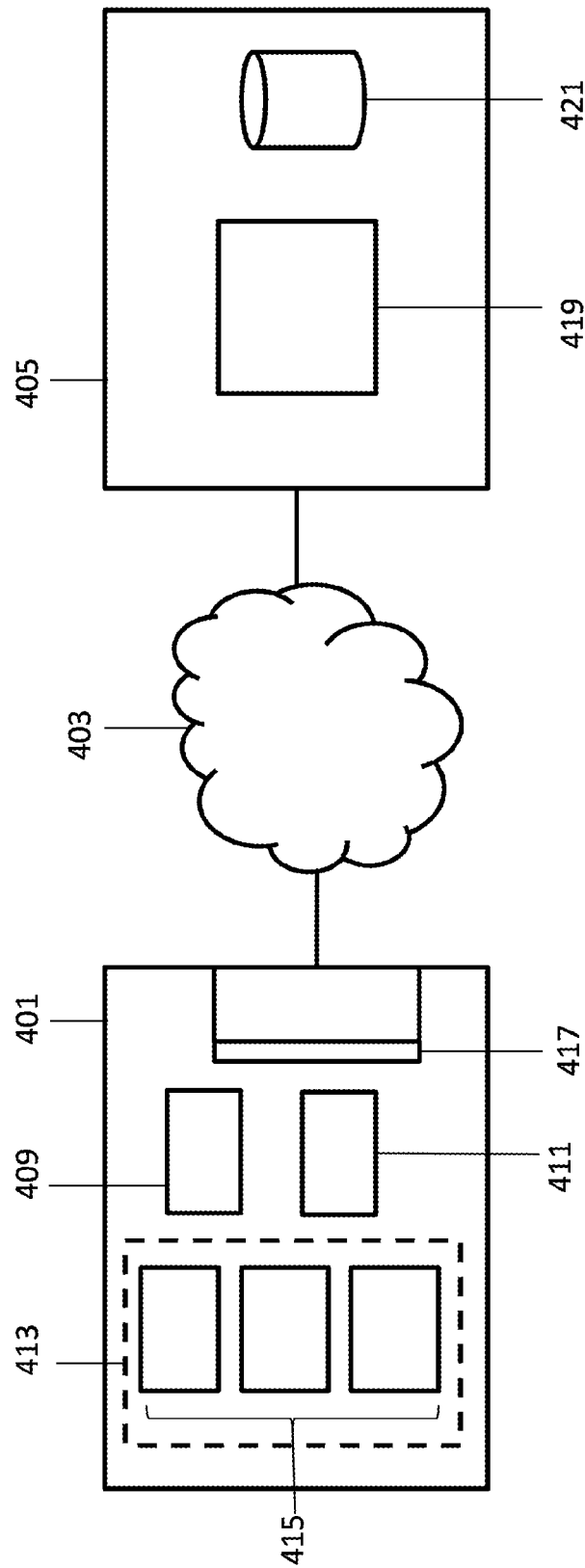
FIG. 4 shows a client and server according to some embodiments.

Reference is made to FIG. 4 which shows a client device connected to a server. Client device 401 has a network interface controller which is configured to communicate over a network 403 with a server 405. Network 105 may be the internet. Client device 401 has at least one processor 409 and at least one memory 411. The at least one processor 409 is configured to, with the at least one memory 411 to run an operating system 413. One or more applications 415 are configured to run on client device 401. The one or more applications 415 may comprise one or more game applications. The one or more applications 415 may communicate with server 405.

Server 405 is configured to run a back-end server application 419. Back-end server application 419 may be configured to store and retrieve data in a database 421. The one or more applications 415 of the client device 401 may wish to access data stored in database 421 or may wish to communicate with another client device via server 405. The one or more applications 415 of client device 401 must know how to communicate with back-end server application 419.

The rules required to communicate with back-end server application 119 are stored in client API (Application Programming Interface) 417.

Client API 417 may be compiled into an application, for example an application for a mobile device (for example a device running iOS) may execute pre-compiled applications which comprise the client API 417. Alternatively the client API 417 may be external to the applications. For example, on a computer running a Windows operating system, the client API 417 may be stored in a DLL (Dynamic Link Library) which may be accessed by application running on the computer. The client API 417 may therefore be provided with or separately to the applications. Alternatively, the application may be a web browser running a web application embedded in a web page. The client API may be code written in a web language to allow the web application to communicate with the server. For example, the client API may be written in Javascript or Flash.

It is commonplace for both applications and back-end server applications to require updating. This may be, for example, to introduce new features or fix existing bugs with either application. It may be the case that an update to the back-end server application will require an update to the client API in order to maintain compatibility. It is however preferable to maintain backwards compatibility with the client API to remove unnecessary updating so that even if the client API is not updated, it will still be able to communicate successfully to the server but will not be able to benefit from the additional functionality.

Whenever changes are made to the back-end server application that affects the communication with client devices, the client API must also be changed. Traditionally, these changes will require a programmer to redesign at least some part of the client API code.

According to an embodiment of the present application, a method for compiling the server code is used to automatically generate an updated client API.

A compiler typically consists of three components: the front end; the middle end; and the back end. The front end of the compiler verifies the syntax of the code and produces an abstract syntax tree (AST). An AST is a data structure produced by syntax analysis and represents the structure of the source code. The middle end of the compiler provides optimisation whilst the back end generates the final assembly code.

According to one embodiment the AST may be analysed to produce a client API according to a set of rules. The compiler may be configured to produce multiple client APIs for use on different operating systems or in different programming languages.

Figure 5:
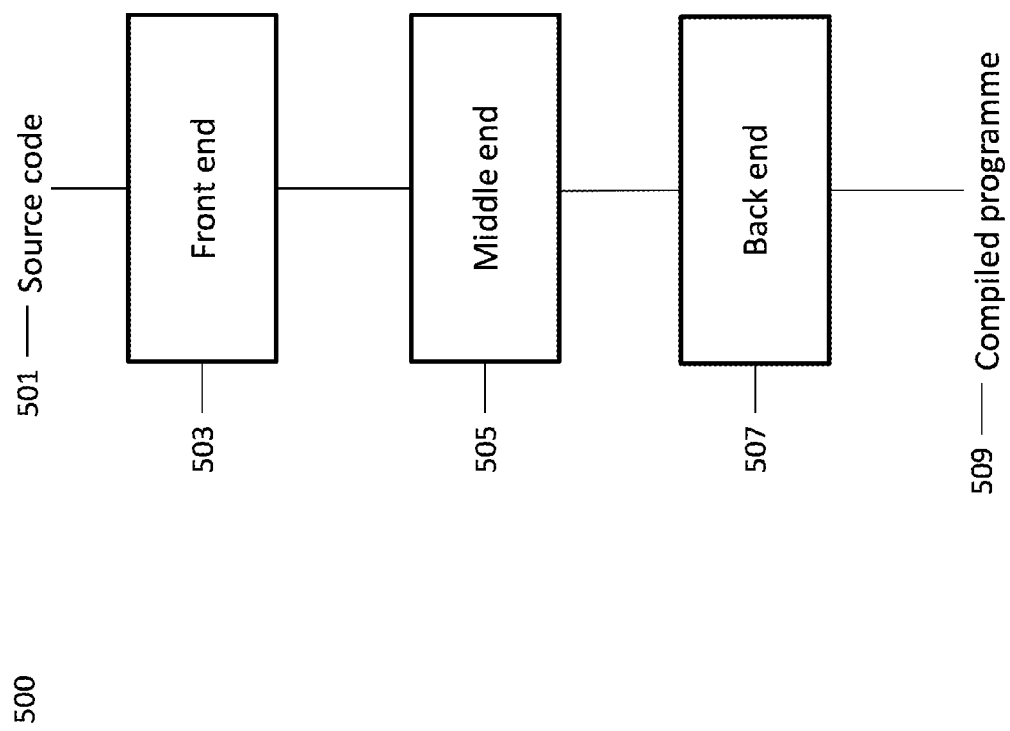
FIG. 5 shows a compiler method according to prior art

Reference is made to FIG. 5 which shows the method of traditional compiler. The compiler receives source code 501 to be compiled. Source code 501 is analysed by front end 503. The syntax is verified and an abstract syntax tree is generated. The processed source code is then passed to the middle end 505 of the compiler. Middle end 505 optimises the source code which is then passed to back end 507. Back end 507 generates the assembly code 509 for execution on a processor.

Figure 6:
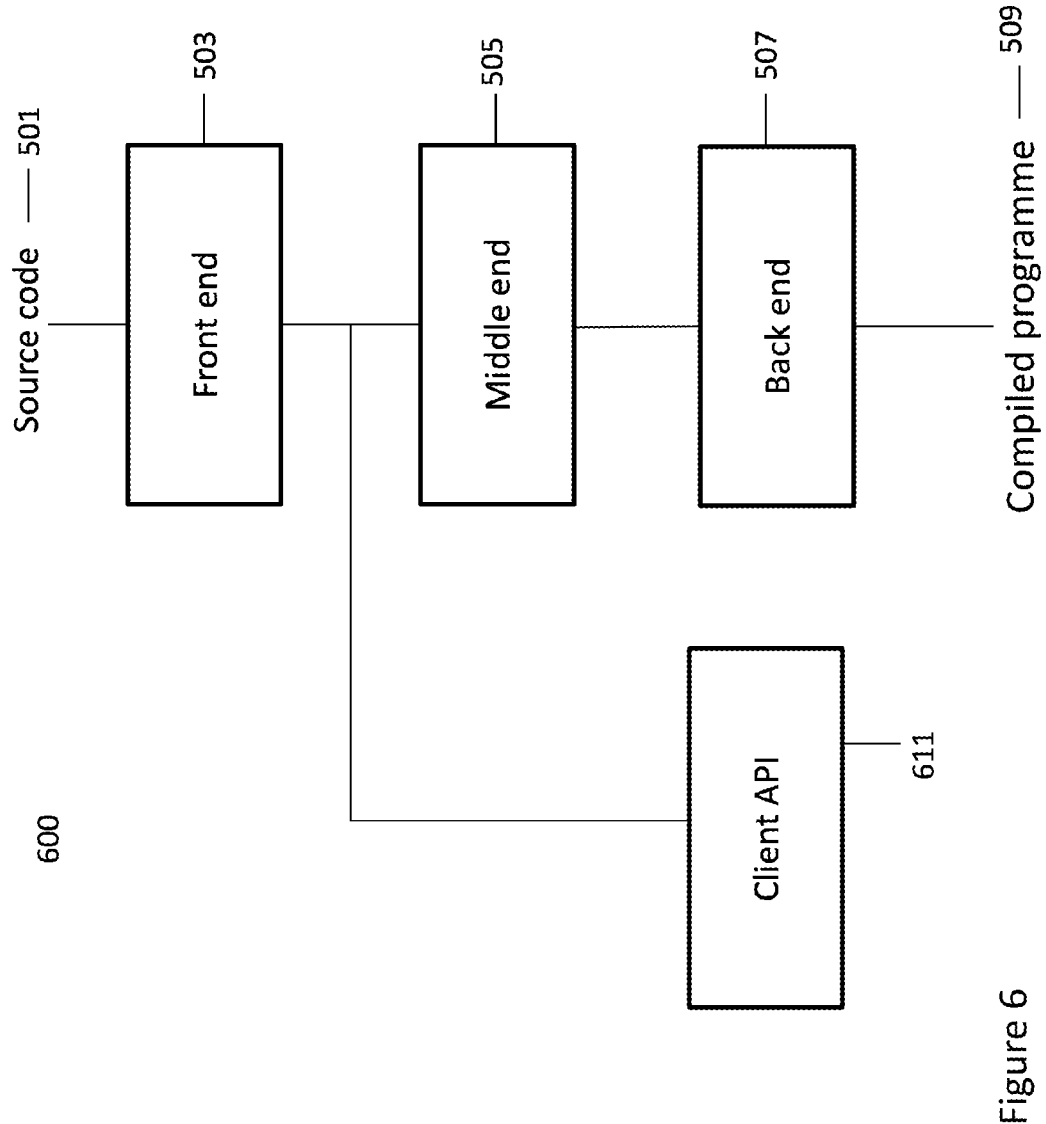
FIG. 6 shows a method for automatic generation of a client API according to some embodiments.
Figure 7:
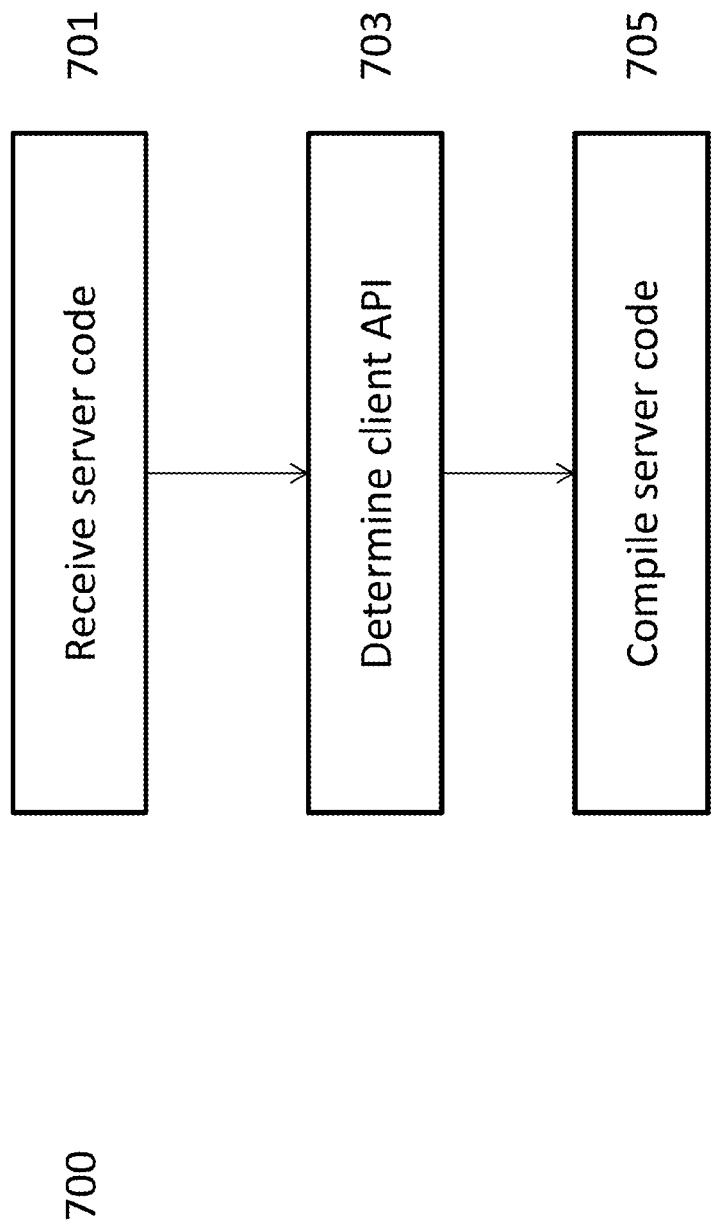
FIG. 7 shows a method according to some embodiments.

Reference is made to FIG. 6 which shows a method according to an embodiment. The abstract syntax tree output from the front end is analysed and used to generate client API 611. The compiler is configured to produce a protocol specification from the abstract syntax tree. From this client API code in one or more languages may be produced to interface between a client application and the server using the determined protocol specification.

Different client devices may run different operating systems which may require being programmed in different languages. These different programming languages may support different variable types. Accordingly if a back-end server application uses types unsupported by these programming languages, some client devices may be unable to communicate with the server. To avoid this problem, the compiler may verify that all types requires in the protocol are supported by all target programming languages on all target devices. In one embodiment, the compiler may be configured to display an indication that an unsupported type has been used. For example, an error message may be displayed. In another embodiment, the compiler may be configured to exclude the use of these variables types. In yet another embodiment, the compiler may be configured to substitute unsupported types with compatible alternatives.

Reference is made to claim 7 which shows a method according to an embodiment. Method 700 comprises receiving the programming code to be compiled at step 701. At step 703, a client API for communication with the server application is determined. At step 705 the server application is compiled.

The invention claimed is:

1. A method comprising:
   receiving programming code for a server application, said server application configured to communicate with a client application via a client application programming interface;
   compiling the received programming code into an executable server application, said compilation comprising generating an abstract syntax tree from said received programming code to produce a protocol specification;
   determining, using said protocol specification, at least one programming code for said client application programming interface dependent on content of said abstract syntax tree and at least one rule; and
   wherein the said method comprises determining from said abstract syntax tree if said received programming code comprises at least one unsupported variable type, the compiling further comprising excluding the at least one unsupported variable types from the client application programming interface.

2. The method of claim 1 comprising determining from said abstract syntax tree if said received programming code comprises at least one unsupported variable type.

3. The method of claim 2 comprising displaying an indication that said received programming contains an unsupported programming code dependent on said determining.

4. The method of claim 2 wherein said determining at least one programming code is dependent on the contents of said abstract syntax tree.

5. The method of claim 2, wherein the compiling further comprises substituting the at least one unsupported variable type with at least one compatible alternative.

6. The method of claim 1 wherein the at least one rule is dependent on a target programming language.

7. The method of claim 1 wherein the at least one rule is dependent on a target operating system.

8. The method of claim 1 comprising determining a plurality of programming codes for different corresponding client interfaces dependent on at least one rule.

9. The method of claim 1 wherein said at least one programming code is automatically updated when the programming code for the server application is compiled.

10. A system comprising:
    a computer with one or more processors and a memory;
    a compiler executing on the computer, the compiler configured to:
    receive programming code for a server application, said server application configured to communicate with a client application via a client application programming interface;
    compile the received programming code into an executable server application, said compilation comprising generating an abstract syntax tree from said received programming code to produce a protocol specification;
    determine, using said protocol specification, at least one programming code for said client application programming interface in dependence on content of said abstract syntax tree and at least one rule; and
    wherein the said compiler configured to determine from said abstracts syntax tree if said received programming code comprises at least one unsupported variable type, the compiler is further configured to exclude the at least one unsupported variable types from the client application programming interface.

11. The system of claim 10, wherein the compiler is further configured to determine from said abstract syntax tree if said received programming code comprises at least one unsupported variable type.

12. The system of claim 11, wherein the compiler is further configured to display an indication that said received programming contains an unsupported programming code dependent on said determining.

13. The system of claim 11, wherein said determining at least one programming code is dependent on the contents of said abstract syntax tree.

14. The system of claim 11, wherein the compiler is further configured to substitute the at least one unsupported variable type with at least one compatible alternative.

15. The system of claim 10 wherein the at least one rule is dependent on a target programming language.

16. The system of claim 10 wherein the at least one rule is dependent on a target operating system.

17. The system of claim 10, wherein the compiler is further configured to determine a plurality of programming codes for different corresponding client application interfaces dependent on at least one rule.

18. The system of claim 10, wherein the compiler is further configured to automatically update the at least one programming code when the programming code for the server application is compiled.

* * * * *